Jan. 4, 1927.
O. H. THELEEN
1,612,953
FLUSHING MECHANISM
Original Filed March 14, 1921
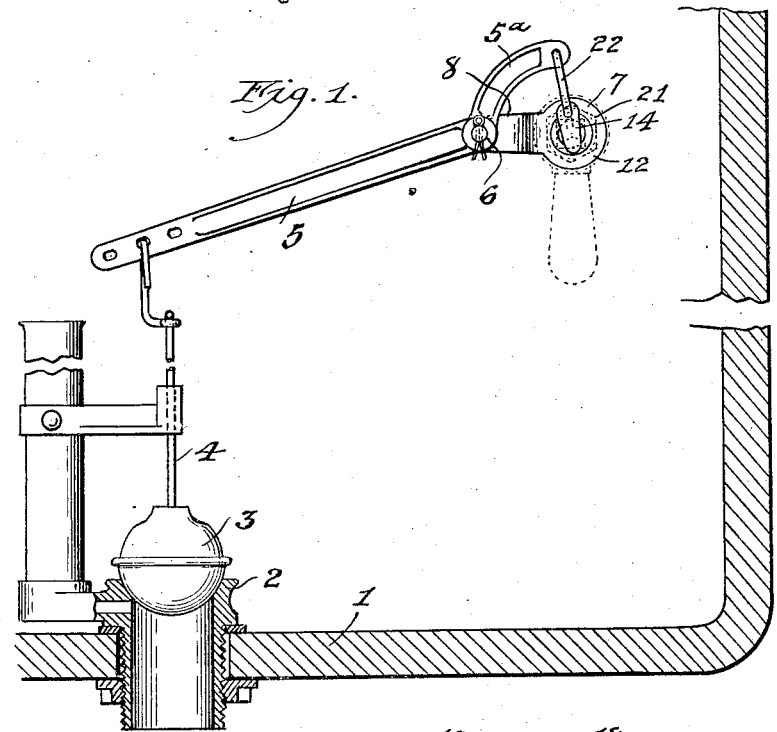
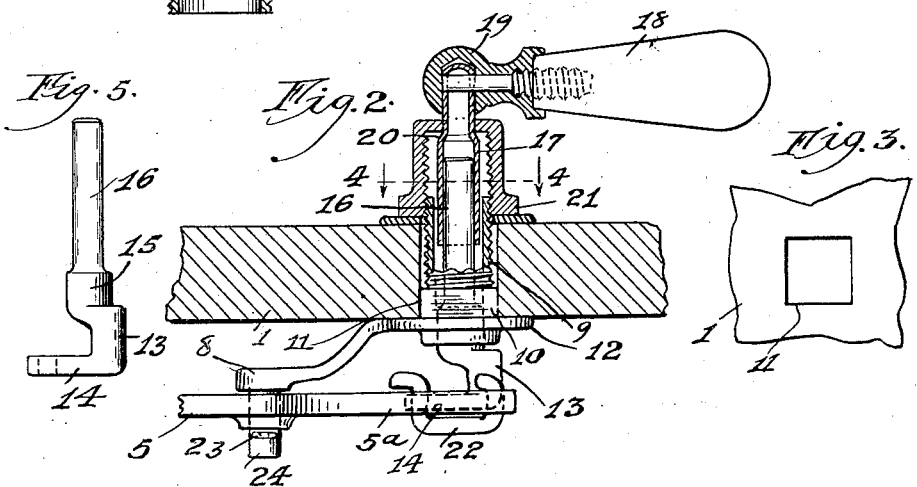
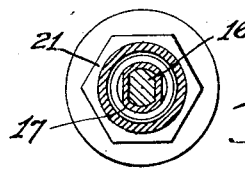
Inventor,
Oscar H. Theleen.
Witness, Patented Jan. 4, 1927.

1,612,953

UNITED STATES PATENT OFFICE.

OSCAR H. THELEEN, OF KENOSHA, WISCONSIN, ASSIGNOR TO FROST MANUFACTURING COMPANY, OF KENOSHA, WISCONSIN, A CORPORATION OF WISCONSIN.

FLUSHING MECHANISM.

Application filed March 14, 1921. Serial No. 452,092. Renewed November 17, 1924.

This invention relates to improvements in flushing mechanism and refers more particularly to the operating handle and operating parts used in connection with low-down closet tanks.

Among the salient objects of the invention are to provide a simple operating mechanism for flushing tanks in which friction is greatly diminished and the device so simplified as to reduce materially the number of parts necessary and obviating to a great extent the cost of repair and at the same time furnishing an operating mechanism which effectively actuates the outlet valve.

In the drawings—

Fig. 1 is a vertical section through the flushing tank, showing the general arrangement of the parts.

Fig. 2 is a cross section on the line 2—2 of Fig. 1 with parts broken away and parts in changed relation to each other.

Fig. 3 is a fragmentary view of part of the tank wall.

Fig. 4 is a sectional view of the bearing casting.

Fig. 5 is a detail view of the cam and shaft arrangement.

Referring to the drawings—1 designates a flushing tank provided with the usual outlet 2. The outlet flow is controlled by means of a float valve 3 suspended by a link 4 from the operating lever arm 5 which is pivoted at 6 to the support arm of the bearing member 7. This support bearing comprises a support arm 8 to which the lever arm 5 is pivoted and a threaded bearing member 9 and a squared portion 10. The squared portion is adapted to be fitted in the squared hole 11 in the wall of the tank, the flanged side 12 fitting flush against the inner side. Fitting in the bearing member 9 is a cam shaft 13 on the end of which is formed the cam member 14. This cam shaft 13 has a machined bearing surface 15 which fits in the bearing member 9, the remaining portion 16 being flattened so as to fit in the telescopic member 17. On to the outer end of the member 17 is fitted the porcelain or vitrified handle 18 by means of a metallic angle cap 19. The member 17 is beveled as shown at 20 so that the escutcheon shaped nut 21, which is internally threaded and screws over the bearing member 9, prevents the telescoping member 17 from sliding outwardly. The escutcheon shaped nut in this manner holds the cam shaft and telescoping member 17 in constant engagement, this arrangement permitting the fitting of the operating handle upon a tank wall of any thickness.

By constructing the rotatable shaft portion in two parts in this manner the shaft is self regulating as concerns the thickness of the wall to which it is to be applied and rigid as to rotatable movement, rotating as a unit due to the flattened telescopic members 9 and 17 which serve as a rotatable shaft, the outer bearing of the shaft being in the escutcheon shaped nut. The end of the cam is bored to accommodate a link member 22 which connects the cam with the end of the curved portion 5ª of the lever arm 5. The ends of this link are turned down to fit closely against the inner sides of the cam and lever arm surfaces respectively. These turned down portions prevent the link from being extracted from the cam and lever arm and at the same time prevents the cam shaft from sliding transversely in the bearing, the lever arm being held by a cotter pin 23 in the pivot shaft 24. This feature obviates the necessity of set screws and permits the easy removal of the entire shaft mechanism by taking out the cotter pin 23.

From the description, the operation of the valve 3 is obvious as the rotation of the handle 18 causes the cam to rotate which through the link draws down the arm 5ª, lifting the valve 3 from its seat through the lever arm 5 and the link connection 4.

An important feature of this device is the fact that the handle is rotatable through 360° and is substantially frictionless, friction being a common objection to the usual type of flushing mechanism. Also, operating handles now in use in this connection are only rotatable through a restricted angle and forcing the handle in either direction is liable to disrupt the operating parts. The present invention does away with this objection in that the operating handle may be rotated at will. The telescoping shaft arrangement not only makes the device easily applicable to a tank wall of any thickness but the ease of installation also is a prime factor in its convenience. The details of the device are in no way limited other than by the features brought out more clearly in the appended claims.

I claim as my invention:—

1. In a lever mechanism, the combination with a pivoted lever arm having one end connected to a valve mechanism, of a fixed bearing carrying a divided shaft journalled therein, a cam mounted on said shaft, a link connection with the cam and lever arm whereby the actuation of the shaft is adapted to actuate the valve mechanism, said link comprising a rod having bent end portions adapted to lock the related parts against disengagement.

2. In a lever mechanism, the combination with a pivoted lever arm having one end connected to a valve mechanism, of a fixed bearing carrying a divided shaft journalled therein, a cam mounted on said shaft and a link connection between the cam and the lever arm whereby the actuation of the shaft is adapted to actuate the valve mechanism, said link comprising a rod having bent ends readily detachable from its related parts with the removal of the lever from its pivot, and adapted to lock the related parts against disengagement.

3. In a flush tank mechanism, the combination with a divided shaft actuated by a handle and having a crank, of a pivoted lever, a link between the crank and lever, a valve communicating with the lever adapted to be functioned by the actuation of the handle, said link being disengageable with the lever and crank relative to the removal of the lever from its pivot, and comprising a stock or body portion having angular connecting portions and substantially parallel extensions, from the angular connecting portions, the parallel extensions extending in the same direction.

4. A flushing mechanism comprising in combination a shaft having a crank, a pivoted lever, and a link between the crank and lever, said link being readily disengageable relative to the lever and crank with the removal of the lever from its pivot and comprising a body portion having angular connecting portions forming bearings for the crank and lever, locking means for the crank and lever formed by bending the extremities of said link in the same direction at an angle to the bearings.

OSCAR H. THELEEN.